United States Patent [19]

Yoshigai

[11] Patent Number: 4,823,918
[45] Date of Patent: Apr. 25, 1989

[54] DEVICE FOR HOLDING OUTER WIRE OF BRAKE

[75] Inventor: Kenichi Yoshigai, Osaka, Japan

[73] Assignee: Yoshigai Kikai Kinzoku Co., Ltd., Higashi-Osaka, Japan

[21] Appl. No.: 177,520

[22] Filed: Mar. 21, 1988

[30] Foreign Application Priority Data

Apr. 3, 1987 [JP] Japan ............................ 62-51279[U]

[51] Int. Cl.$^4$ .............................................. B62L 3/02
[52] U.S. Cl. .................................. 188/24.19; 188/20; 188/196 M
[58] Field of Search .............. 188/24.19, 79.5 R, 71.7, 188/2 D, 196 M, 196 B, 196 BA

[56] References Cited

U.S. PATENT DOCUMENTS

| 3,941,215 | 3/1976 | Schoch | 188/24.19 |
| 3,957,138 | 5/1976 | Kine | 188/2 D |
| 4,023,653 | 5/1977 | Yoshigai | 188/2 D |
| 4,066,154 | 1/1978 | Ross | 188/24.19 |
| 4,718,521 | 1/1988 | Hosokawa | 188/24.19 |

FOREIGN PATENT DOCUMENTS

| 155478 | 10/1904 | Fed. Rep. of Germany ... 188/24.19 |
| 760373 | 10/1956 | United Kingdom ........... 188/196 M |

Primary Examiner—Andres Kashnikow
Assistant Examiner—Matthew C. Graham
Attorney, Agent, or Firm—Sixbey, Friedman, Leedom & Ferguson

[57] ABSTRACT

A device for holding a brake outer wire comprising a hollow screw tube for holding one end of the outer wire as inserted therein, a wire adjusting nut having the screw tube screwed therein, a holder main body mounted on an arm extending from a small brake arch and rotatably supporting the adjusting nut thereon, a rotatable knob portion provided at one end of the adjusting nut and having a recess in one side thereof opposed to the holder main body, a ring fitted in the recess nonrotatably relative to the knob portion and a wavy washer provided in the recess for biasing the ring toward the holder main body. One of the holder main body and the ring has a rugged surface opposed to the other, and the other of the main body and the ring has projections engageable with the rugged surface with a click when the adjusting nut is rotated.

7 Claims, 2 Drawing Sheets

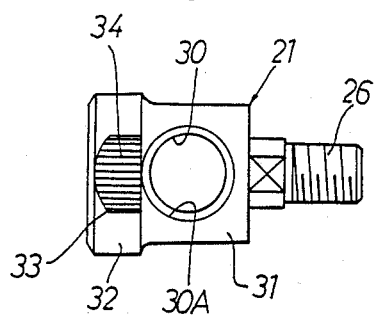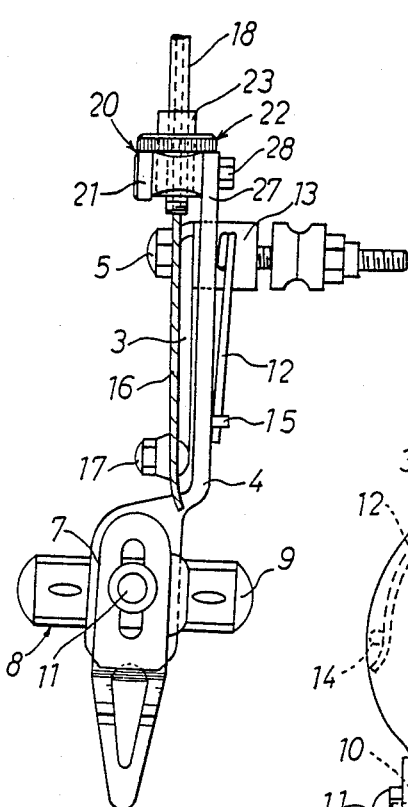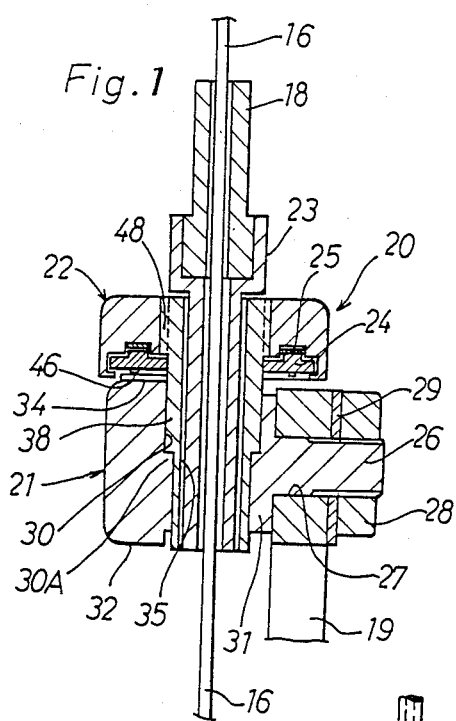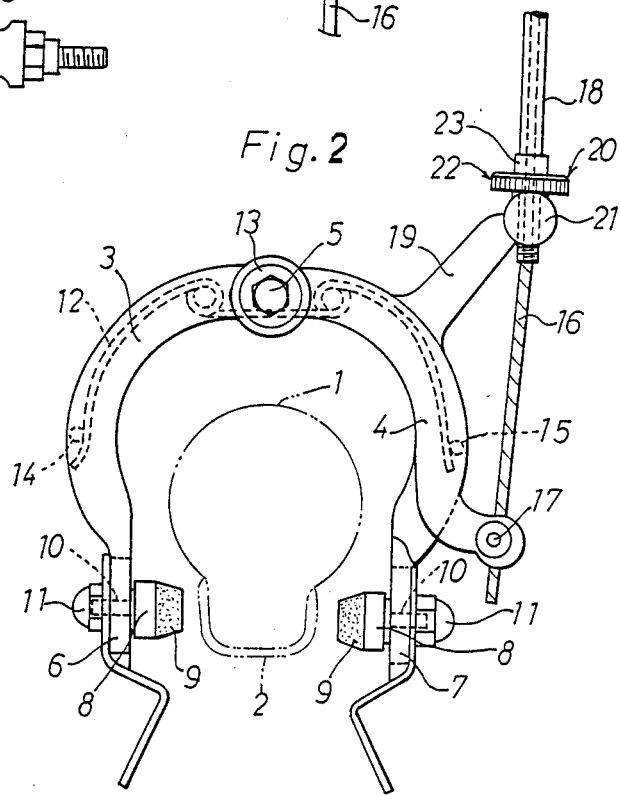

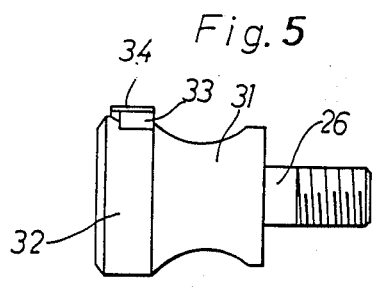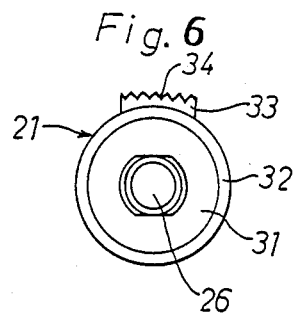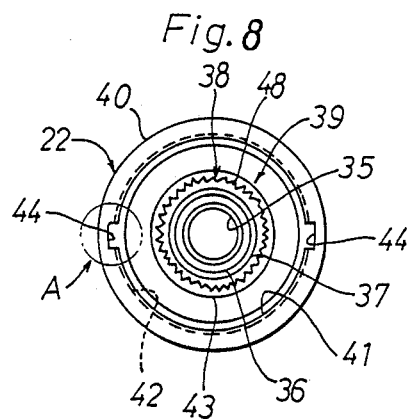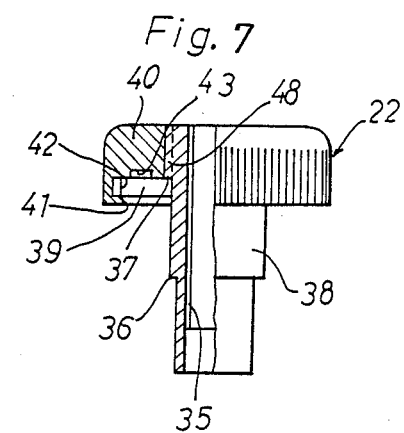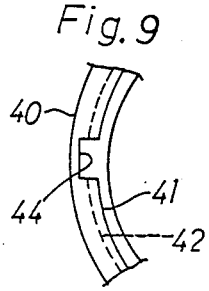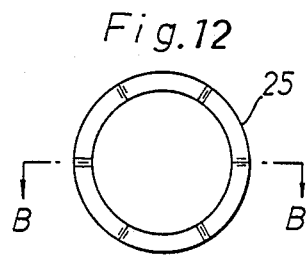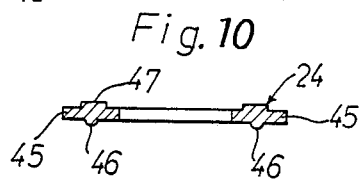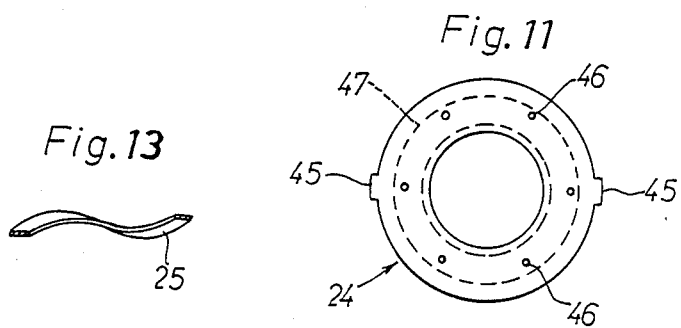

DEVICE FOR HOLDING OUTER WIRE OF BRAKE

FIELD OF THE INVENTION AND RELATED ART STATEMENT

The present invention relates to a device for use in bicycle brakes for fixedly holding the brake outer wire to an arm end of a brake arch.

With conventional brakes for bicycles, the outer wire is fixedly held by a holder to an arm end extending from the small arch of the brake. The outer wire holder comprises a holder main body fixed to the arm end, an adjusting nut rotatably mounted on the holder main body, and a hollow screw tube screwed in the adjusting nut and holding one end of the outer wire as inserted therein. The wire is adjusted by rotating the nut and thereby moving the screw tube axially thereof relative to the nut.

However, when the adjusting nut is rotated with fingers, it is difficult to perceive how much the nut is rotated owning to slippage, or the amount of rotation of the nut must be judged visually. Thus, it is difficult to accurately recognize the amount of adjustment of the wire made. Accordingly, the wire must be adjusted repeatedly while operating the brake lever to check the brake action.

OBJECTS AND SUMMARY OF THE INVENTION

The present invention has been accomplished in view of the foregoing problem.

A first object of the present invention is to provide a brake outer wire holding device comprising a wire adjusting nut which is rotatable with a click to properly indicate the amount of rotation thereof so that the brake wire can be adjusted with ease quickly.

A second object of the invention is to provide a brake outer wire holding device which is less prone to clogging with mud, soil or the like so as to click properly free from such deposit.

In a brake including a pair of large and small pivotally movable brake arches 3, 4 each having a brake shoe 9 at its lower end, a spring 12 for biasing the lower ends of the brake arches 3, 4 away from each other, an inner wire 16 for pulling the large brake arch 3 to move the lower ends of the brake arches 3, 4 toward each other, an outer wire 18 having the inner wire 16 extending therethrough, and an outer wire holder 20 for fixedly holding the outer wire 18 at the outer end of an arm 19 extending from the small brake arch 4, the above first and second objects can be fulfilled by a device serving as the outer wire holder 20 and characterized in that the device comprises a hollow screw tube 23 for holding one end of the outer wire 18 as inserted therein, a wire adjusting nut 22 having the screw tube 23 screwed therein, a holder main body 21 mounted on the arm 19 of the small brake arch 4 and rotatably supporting the wire adjusting nut 22 thereon, a rotatable knob portion 40 provided at one end of the wire adjusting nut 22 are formed with a recess 39 in one side thereof opposed to the holder main body 21, a ring 24 fitted in the recess 39 nonrotatably relative to the knob portion 40, and a biasing member 25 provided in the recess 39 and biasing the ring 24 toward the holder main body 21, one of the holder main body 21 and the ring 24 being formed with a rugged surface 34 opposed to the other, the other of the holder main body 21 and the ring 24 being provided with projections 46 engageable with the rugged surface 34 when the wire adjusting nut 22 is rotated.

BRIEF DESCRIPTION OF THE DRAWINGS

The drawings show an embodiment of the invention.

FIG. 1 is a fragmentary view in vertical section;

FIG. 2 is a front view of a brake;

FIG. 3 is a side elevation of the same;

FIG. 4 is a plan view of a holder main body;

FIG. 5 is a front view of the same;

FIG. 6 is a left side elevation of the same;

FIG. 7 is a front view partly broken away and showing a wire adjusting nut;

FIG. 8 is a bottom view of the same;

FIG. 9 is an enlarged view showing the portion A in FIG. 8;

FIG. 10 is a view in vertical section of a ring;

FIG. 11 is a rear view of the same;

FIG. 12 is a plan view of a wavy washer; and

FIG. 13 is a view in section taken along the line B—B in FIG. 12.

DESCRIPTION OF THE PREFERRED EMBODIMENT

An embodiment of the invention will be described below with reference to the drawings.

FIGS. 2 and 3 show a tire 1, a rim 2, a C-shaped large brake arch 3 and a Y-shaped small brake arch 4. Above the tire 1, the two arches 3 and 4 are pivotally movably supported by a pivot 5 on the body of a bicycle. The large and small brake arches 3, 4 respectively have mount portions 6, 7 disposed at opposite sides of the rim 2 and opposed to each other. A brake shoe 9 fixed to a frame 8 is attached to each of the mount portions 6, 7 by a bolt 10 and a nut 11.

A spring 12, resembling spectacles, is retained by a large-diameter portion of the pivot 5 and engaged with projections 14, 15 on the brake arches 3, 4 for biasing the two brake arches 3, 4 away from each other.

An inner wire 16 has one end connected to a brake lever and the other end connected to the large brake arch 3 by a fastener 17.

An outer wire 18 is connected by a outer wire holder 20 to the outer end of an arm 19 extending from the small brake arch 4. The outer wire 18 has the inner wire 16 extending therethrough.

With reference to FIGS. 1 and 4 to 13, the outer wire holder 20 comprises a holder main body 21, a wire adjusting nut 22, a hollow screw tube 23, a ring 24 and a wavy washer 25 made of spring steel and serving as a biasing member. The holder main body 21 has a screw portion 26 inserted through a bore 27 in the outer end of the arm 19 and fastened to the arm end by a nut 28 and a washer 29.

As seen also in FIGS. 4 to 6, the holder main body 21 comprises the above-mentioned screw portion 26, a shank 31 having a nut insertion bore 30 extending in a direction intersecting its axis at right angles therewith, and an enlarged head 32. The head 32 has a projection 33 on the upper side thereof, i.e. on one side of the axis of the bore 30. The projection 33 has a flat upper surface formed with a plurality of ridges 34, the surface thus being a rugged surface. The ridges 34 are formed by knurling.

The wire adjusting nut 22 is cylindrical hollow and comprises a nut member 38 and a rotatable knob member 40 as seen in FIGS. 7 to 9. The nut member 38 has a threaded inner periphery 35, upper and lower stepped portions 36, 37 on its outer periphery, and a large-diameter portion 48 toward its upper that is and knurled over its outer peripheral surface. The knob member 40 has the large-diameter portion 48 of the nut member 38 tightly inserted therein by a press fit, is provided with a knurled outer periphery and is formed with a recess 39 in its lower side. The recess 39 includes an annular circumferential groove 42 having a larger diameter than the opening 41 of the recess 39 in the lower side of the knob member, and an annular groove 43 opened downward for the wavy washer 25 to fit in. The bottom inner periphery of the knob member 40 defining the opening 41 has a pair of opposed cutouts 44 for the ring 24 to engage in nonrotatably relative to the knob member. The adjusting nut 22 is inserted through the bore 30 in the holder main body 21, with the stepped portion 36 of the nut 22 bearing on a stepped portion 30A within the bore 30. To render the nut 22 rotatable in this state without slipping upwardly off the main body 21, the lower end of the nut member 38 is outwardly spread for crimping.

With reference to FIGS. 10 and 11, the ring 24 has two projections 45 on its outer periphery in a symmetrical arrangement. The distance between the outer ends of the projections 45 is slightly made smaller than the distance between the outer ends of the cutouts 44 of the recessed portion 39. The outside diameter of the circular-arc periphery of the ring 24 is slightly larger than the diameter of the lower opening 41 of the recess 39. The projections 45 are slightly smaller than the cutouts 44 in the nut 22 in width. The ring 24 is formed on its lower side with a plurality of projections 46 arranged on a circle and on its upper side with an annular projection 47 fittable in the annular groove 43 in the recess 39.

Accordingly, the wavy washer 25 shown in FIGS. 12 and 13 is first inserted into the annular groove 43 in the adjusting nut 22, and the ring 24 is then forced into the recess 39 in the knob member 40 through the opening 41 and positioned in the annular circumferential groove 42, with the projections 45 engaged in the cutouts 44, whereby the ring 24 is retained in the adjusting nut 22 nonrotatably relative thereto without slipping off. Consequently, the ring 24 is resiliently pressed against the bottom inner peripheral portion of the knob member 40 defining the annular circumferential groove 42, whereby the projection 46 is disengageably biased into contact with the ridges 34 on the holder main body 21.

When the adjusting nut 22 is rotated to adjust the brake wire, the hollow screw tube 23 is advanced or retracted to alter the fixed position of the outer wire 18. At the same time, the ring 24 also rotates with the nut 22, with the result that the projections 46 are engaged with and disengaged from the ridges 34 on the holder main body 21 one after another by being biased by the washer 25 to make clicks. The jolt resulting from the passage of the projections 46 over the ridges 34 is absorbed by the resiliency of the wavelike washer 25.

The clicking due to the rotation of the wire adjusting nut 22 enables the user to recognize that the nut 22 is being rotated, further accurately indicating the amount of rotation of the adjusting nut 22. This renders the brake adjustable easily and smoothly.

Since the ring 24 and the biasing member 25 are accommodated in the recess 39 which is open downward and formed in the lower side of the knob member 40 at the upper end of the adjusting nut 22, mud, soil or the like is less likely to clog the recess 39 than when the recess is open upward, consequently assuring proper clicking free from such deposits.

The means for fitting the ring 24 is not limited to the structure of the above embodiment. Furthermore, the projections 46 may be provided on the holder main body 21, with the ridges 34 formed on the ring 24. A plate spring or the like is usable instead of the wavy washer 25.

What is claimed is:

1. In a brake including a pair of large and small pivotally movable brake arches, each having a brake shoe at a lower end, a spring for biasing the lower ends of the brake arches away from each other, an inner wire for pulling the large brake arch to move the lower ends of the brake arches toward each other, an outer wire having the inner wire extending therethrough, and an outer wire holder for fixedly holding the outer wire at the outer end of an arm extending from the small brake arch, and a device for holding the outer wire of the brake, wherein said device comprises a hollow screw tube for holding one end of the outer wire as inserted therein, a wire adjusting nut having the screw tube screwed therein, a holder main body mounted on the arm of the small brake arch and rotatably supporting the wire adjusting nut thereon, a rotatable knob portion provided at one end of the wire adjusting nut and formed with a recess in a side thereof that is opposed to the holder main body, a ring fitted in the recess in a rotatably fixed and axially displaceable manner relative to the knob portion, and a biasing member provided in the recess and biasing the ring toward the holder main body, one of the holder main body and the ring being formed with a rugged surface opposed to the other, the other of the holder main body and the ring being provided with at least one projection that is engageable with the rugged surface under action of the biasing member in a manner enabling rotation of the wire adjustment nut in and out with a resultant production of a noise due to contact between the rugged surface and projection as the ring moves axially with and against the biasing of said biasing member.

2. A device as defined in claim 1, wherein the knob portion is provided at the upper end of the wire adjusting nut and said recess is formed in its lower side facing the holder main body.

3. A device as defined in claim 1 wherein the holder main body is provided with a projection having a flat upper surface, and the flat upper surface is formed with a plurality of ridges to serve as the rugged surface.

4. A device as defined in claim 3, wherein the flat upper rugged surface of the projection is formed by knurling.

5. A device as defined in claim 1, wherein the projections are formed on the ring and are equidistantly spaced circumferentially thereof.

6. A device as defined in claim 1, wherein the biasing member is a wavy washer.

7. A device according to claim 1, wherein said ring is mounted in a manner closing off the recess of the adjusting nut within which said biasing member is disposed for preventing clogging of said recess.

* * * * *